Feb. 28, 1950

M. W. GOLDBERG 2,499,060

SKIP CARRIAGE TRACK

Filed Nov. 7, 1946

INVENTOR.
Max W. Goldberg
BY
Morsell & Morsell
ATTORNEYS.

Feb. 28, 1950 — M. W. GOLDBERG — 2,499,060
SKIP CARRIAGE TRACK
Filed Nov. 7, 1946 — 2 Sheets-Sheet 2
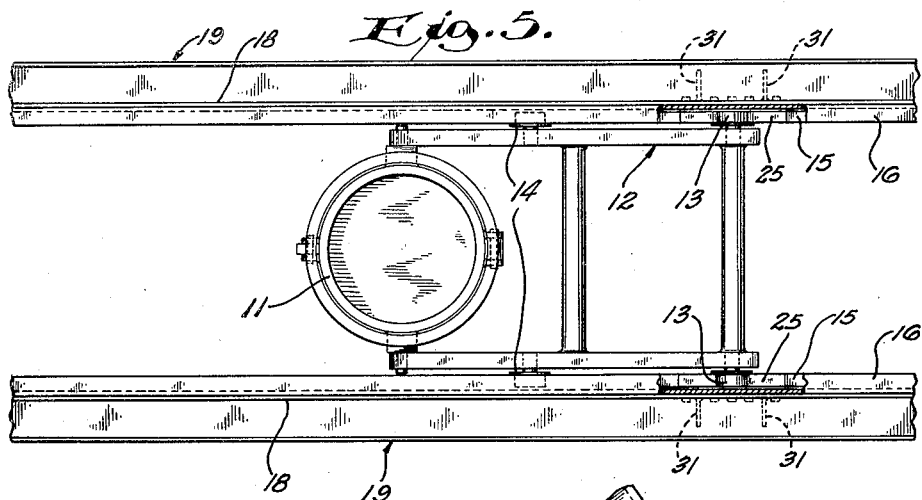
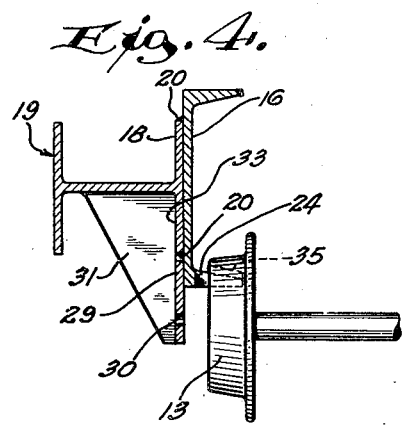
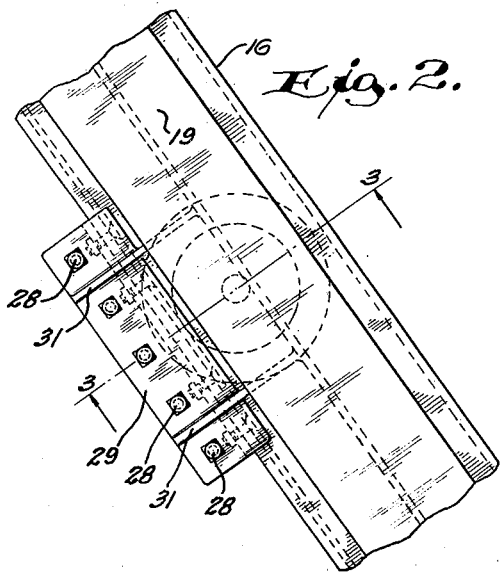
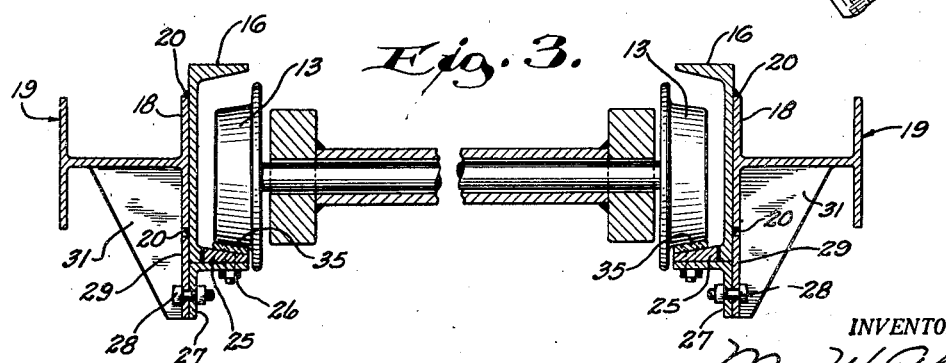
INVENTOR.
Max W. Goldberg
BY Morsell & Morsell
ATTORNEYS.

Patented Feb. 28, 1950

2,499,060

UNITED STATES PATENT OFFICE 2,499,060

SKIP CARRIAGE TRACK

Max W. Goldberg, West Bend, Wis., assignor to Modern Equipment Company, Port Washington, Wis., a corporation of Wisconsin Application November 7, 1946, Serial No. 708,416

7 Claims. (Cl. 104—94)

This invention relates to improvements in skip carriage tracks.

Foundry cupolas are commonly charged by means of buckets supported on skip carriages, the latter operating on a track leading to the charging opening of the cupola. In most charging assemblages the track is formed by spaced channels with the wheels of the skip riding within the channels while supported on the lowermost flange. Occasionally it is necessary to make repairs on the skip carriage or on the bucket associated therewith. If these repairs are extensive it may be necessary to remove the carriage from the track to render the parts more accessible. At the present time in order to effect such removal it is necessary to cut out sections of the track, and such cutting necessitates the welding of the cut sections back in place after the carriage has been repaired and reinstalled in operative position. This procedure is necessarily troublesome and takes such a long time, in certain cases, that the cupola may lose its heat and have to be temporarily shut down.

It is a general object of the present invention to provide means whereby a skip carriage may be quickly removed from its track and replaced so that cupola operations can be continued within a very short interval of time after the difficulty has been discovered.

A more specific object of the invention is to provide in a construction as above described separable track sections, together with means for rigidly supporting and bracing said track sections during normal use while permitting quick removal thereof when required.

A still more specific object of the invention is to provide in a construction as above described having rails provided with bottom wheel supporting flanges, means providing for the quick removal of an elongated section of metal from the flange on each rail, said sections being of sufficient length to permit the withdrawal of the skip carriage wheels therethrough.

Other objects of the invention are to provide a cupola charger track construction which is relatively simple and inexpensive to install, efficient in use, and otherwise well adapted for the purpose described.

With the above and other objects in view, the invention consists of the improvements in skip carriage tracks, and all its parts and combinations, as set forth in the claims, and all equivalents thereof.

In the accompanying drawings, illustrating one complete embodiment of the preferred form of the invention, in which the same reference numerals designate the same parts in all of the views:

Fig. 2 is a fragmentary side elevational view looking at the outer side of one of the skip carriage rails;

Fig. 3 is a transverse sectional view through the track taken on the line 3—3 of Fig. 2 and illustrating the wheels of a skip carriage in operative position, said wheels and the axle therefor being shown in outside view;

Fig. 4 is a view similar to Fig. 3, illustrating one side only, and showing a wheel being withdrawn through the opening in the lower flange which is created when the separable flange section is removed; and Fig. 5 is a fragmentary plan view of a section of track showing the skip carriage in position, portions of the upper flanges of the rails being broken away.

Figure 1:
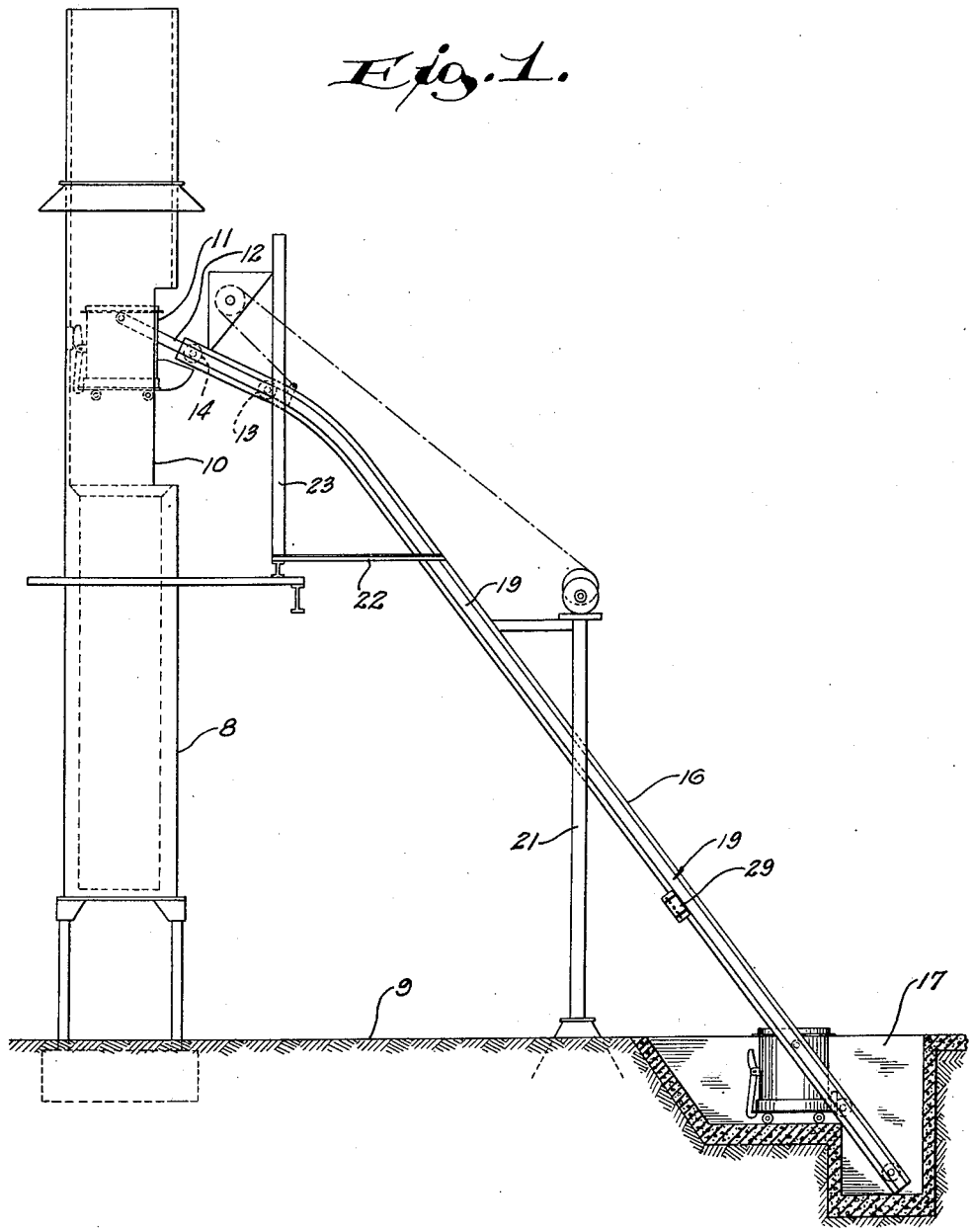
Fig. 1 is a side elevational view showing a cupola and a charger therefor, the charging pit being shown in vertical section.

Referring more particularly to the drawing, the numeral 8 designates a cupola supported on a floor 9. The cupola is provided with a side opening 10 for the reception of a charging bucket 11 pivotally supported on a skip carriage 12. The skip carriage is provided with rear wheels 13 and front wheels 14 which ride on the lowermost flanges 15 of spaced rails 16. Each rail is in the form of a channel and the opening sides of the channels face each other as is illustrated in Fig. 3.

In the type of charger illustrated in Fig. 1, the track extends at an incline upwardly from a charging pit 17 to a location adjacent the opening 10 of the cupola.

Secured to the outer face of each channel forming one of the rails 16, is one side 18 of an I-beam 19. The I-beams are preferably welded to the track forming channels by weld lines 20, as is illustrated in Fig. 4. The beams 19 extend substantially throughout the length of the tracks, as is clear from Fig. 1, and are connected to suitable supports 21, 22 and 23. The charger installation of Fig. 1 is only one type which may advantageously utilize the features of the present invention. There are, however, other charger track arrangements wherein the features of the present invention are applicable.

Referring now to Fig. 4, one of the sets of flanges and preferably the lowermost flanges 15 on opposite sides of the track are cut away to provide openings 24. These openings are adapted to be removably closed by separable flange sections 25 which may be the sawed out pieces. The pieces 25 are of somewhat greater length than the diameter of the skip carriage wheels so that the latter will readily pass through the openings 24 when the separable track sections 25 are removed (see Fig. 4).

Each of the separable rail sections 25 is preferably connected by nuts and bolts 26 to the top flange of an angle iron 27. The other or side flange of each angle iron is, in turn, connected by a row of nuts and bolts 28 (see Figs. 2 and 3), with an elongated plate 29 having a series of holes 30 for receiving the bolts 28. Spaced gussets 31 have rear edges welded or otherwise connected to the plates 29 and to the sides 18 of the I-beams 19. The upper edge of each gusset is welded or otherwise connected to the lower face of the webbing of the I-beam 19.

With the above arrangement, the plates 29 are rigidly and permanently supported in the position shown in Fig. 4 where they serve to firmly and yet removably support the angles 27 when the latter are in the position of Fig. 3. With the angles thus supported, the separable track sections 25 are, of course, maintained in positions which fill in the openings 24, the strips of wear-resistant metal 35 which are supported on the removable rail sections 25 being separable with said sections.

With the above described arrangement, if it becomes necessary to replace the skip carriage, or to repair the latter because of breakage, it is merely necessary to remove the bolts 28 and thus free the angle members 27 and removable track sections 25. The skip carriage may then be moved down the track until the wheels 13 are in registration with the openings 24. The wheels may then be withdrawn through the openings in the manner illustrated in Fig. 4. Following this the skip carriage may be moved farther along until the wheels 14 are in registration with the openings 24. This permits removal of the entire skip carriage and charging bucket.

Heretofore, to accomplish a similar operation it has been necessary to saw off portions of the rails and then later weld the same back in position. During this procedure, which took a substantial length of time, no fuel could be delivered to the cupola, and the latter might cool off to a substantial degree before the repairs could be completed. The shutting down of a cupola is, of course, to be avoided wherever possible.

With the present arrangement, if the repairs to the skip carriage are extensive, a substitute skip carriage can be inserted through the openings 24, the removable track sections 25 can be replaced, and operations can be resumed in a short period of time. If the repairs are of a minor nature, the same skip carriage can be reinstalled.

Various changes and modifications may be made without departing from the spirit of the invention, and all of such changes are contemplated, as may come within the scope of the claims.

What I claim is:

1. A track for a wheeled skip carriage or the like comprising spaced channel members having open sides facing one another and having bottom wheel supporting flanges, said channel members having portions of the bottom flanges provided with transversely alined, elongated, wheel-receiving openings, separable flange sections for closing said openings, supports for said separable sections, bracing means permanently connected to said channels, and readily accessible means readily removably connecting said supports to said bracing means in a position to support the separable sections in closing relationship with respect to said openings.

2. A track for a wheeled skip carriage or the like comprising spaced channel members having open sides facing one another and having bottom wheel supporting flanges, said channel members having portions of the bottom flanges provided with transversely alined, elongated, wheel-receiving openings, separable flange sections for closing said openings, a plate rigidly secured to the exterior of each channel member and projecting therebelow, and readily accessible supporting means for said separable sections readily removably connected to said plates.

3. A track for a wheeled skip carriage or the like comprising spaced channel members having open sides facing one another and having bottom wheel supporting flanges, said channel members having portions of the bottom flanges provided with transversely alined, elongated, wheel-receiving openings, separable flange sections for closing said openings, a plate rigidly secured to the exterior of each channel member and projecting therebelow, an angle member detachably connected to the projecting portion of each plate and having a projecting flange connected to the separable flange section and positioned to support the latter in closing position with respect to said opening.

4. A track for a wheeled skip carriage or the like comprising spaced channel members having open sides facing one another and having bottom wheel supporting flanges, beams secured to the outer surfaces of the backs of said channels and extending longitudinally thereof, said channel members having portions of said bottom flanges provided with transversely alined, elongated, wheel-receiving openings, separable flange sections for closing said openings, plates secured to said channel members and projecting therebelow, gusset members connecting said plates to said beams, supports for said separable flange sections, and means removably connecting said supports to the projecting portions of said plates.

5. A track for a wheeled skip carriage or the like comprising: spaced channel members having open sides facing one another and having bottom wheel supporting flanges and top flanges, one set of said flanges being provided with transversely alined, elongated, wheel-receiving openings; separable flange sections for closing said openings; and connection members removably fixed to said channels in a position to support said sections in said closing position.

6. A track for a wheeled skip carriage or the like comprising: spaced channel members having open sides facing one another and having bottom wheel supporting flanges, said channel members having portions of the bottom flanges provided with transversely alined, elongated wheel-receiving openings; separable flange sections for closing said openings; and connection members removably fixed to said channels in a position to support said sections in said closing position.

7. A track for a wheeled skip carriage or the like comprising; spaced channel members having open sides facing one another and having bottom wheel supporting flanges, said channel members having portions of the bottom flanges provided with transversely alined, elongated, wheel receiving openings; separable flange sections for closing said openings; supporting means for said separable sections; and connection members readily removably connecting said supporting means to the channel members in such a position as to support said separable sections in closing relationship with respect to said openings.

MAX W. GOLDBERG.

REFERENCES CITED

The following references are of record in the file of this patent:

UNITED STATES PATENTS

| Number | Name | Date |
| --- | --- | --- |
| 2,056,217 | Stout | Oct. 6, 1936 |
| 2,128,135 | Glasgow | Aug. 23, 1938 |
| 2,361,882 | Smith | Oct. 31, 1944 |